(12) United States Patent
Franko et al.

(10) Patent No.: US 11,788,038 B2
(45) Date of Patent: Oct. 17, 2023

(54) METHOD AND SYSTEM FOR REMOVING INSOLUBLE SOLIDS MID-EVAPORATION FROM A CORN DRY MILLING PROCESS

(71) Applicant: Fluid Quip Technologies, LLC, Springfield, OH (US)

(72) Inventors: Michael Franko, Denver, CO (US); John Kwik, Bellbrook, OH (US)

(73) Assignee: Fluid Quip Technologies, LLC, Springfield, OH (US)

(*) Notice: Subject to any disclaimer, the term of this patent is extended or adjusted under 35 U.S.C. 154(b) by 147 days.

(21) Appl. No.: 17/002,855

(22) Filed: Aug. 26, 2020

(65) Prior Publication Data

US 2021/0062122 A1    Mar. 4, 2021

Related U.S. Application Data

(60) Provisional application No. 62/893,262, filed on Aug. 29, 2019.

(51) Int. Cl.
| | | |
|---|---|---|
| *C12F 3/10* | (2006.01) | |
| *B01D 1/00* | (2006.01) | |
| *B01D 21/01* | (2006.01) | |
| *C11B 3/00* | (2006.01) | |
| *B01D 21/26* | (2006.01) | |
| *B01D 17/02* | (2006.01) | |

(52) U.S. Cl.
CPC ............... *C12F 3/10* (2013.01); *B01D 1/00* (2013.01); *B01D 17/02* (2013.01); *B01D 21/01* (2013.01); *B01D 21/262* (2013.01); *C11B 3/001* (2013.01); *B01D 2221/06* (2013.01)

(58) Field of Classification Search
CPC ........................................................ C12F 3/10
See application file for complete search history.

(56) References Cited

U.S. PATENT DOCUMENTS

| | | |
|---|---|---|
| 8,778,433 B2 | 7/2014 | Lee |
| 8,813,973 B2 | 8/2014 | Lee et al. |

(Continued)

FOREIGN PATENT DOCUMENTS

WO    WO-2014059273 A1 *  4/2014  ............. A23D 9/013

*Primary Examiner* — Peter Keyworth
(74) *Attorney, Agent, or Firm* — Wood Herron & Evans LLP (57) ABSTRACT

The present invention relates generally to corn dry-milling, and more specifically, to a method and system for removing insoluble solids mid-evaporation in a corn (or similar carbohydrate-containing grain) dry milling process for making alcohol, such as ethanol, and/or other biofuels/biochemicals. In one example, the method for removing residual insoluble solids in a grain dry milling process includes separating a whole stillage byproduct into an insoluble solids portion and a solubles portion, which includes residual insoluble solids. Then, the solubles portion is subjected to a first evaporation, via one or more evaporators, to remove liquid from the solubles portion to define a concentrated solubles portion. After the first evaporation, the residual insoluble solids are separated from the concentrated solubles portion. And thereafter, the concentrated solubles portion is subjected to a second evaporation, via one or more evaporators, to remove additional liquid from the concentrated solubles portion.

12 Claims, 7 Drawing Sheets

(56) References Cited

U.S. PATENT DOCUMENTS

| | | | |
|---|---|---|---|
| 2012/0064213 A1* | 3/2012 | Lee | B04B 3/04 |
| | | | 422/255 |
| 2013/0165678 A1* | 6/2013 | Kohl | C11B 13/00 |
| | | | 422/187 |
| 2015/0197439 A1* | 7/2015 | Zou | D21H 17/01 |
| | | | 210/730 |
| 2017/0166835 A1* | 6/2017 | Jakel | C11B 13/00 |

* cited by examiner

METHOD AND SYSTEM FOR REMOVING INSOLUBLE SOLIDS MID-EVAPORATION FROM A CORN DRY MILLING PROCESS

TECHNICAL FIELD

The present invention relates generally to corn dry-milling, and more specifically, to methods and systems for removing insoluble solids mid-evaporation in a corn (or similar carbohydrate-containing grain) dry milling process for making alcohol, such as ethanol, and/or other biofuels/biochemicals.

BACKGROUND

Wet mill corn processing plants convert, for example, corn grain into several different natural co-products, such as germ (for oil extraction), gluten feed (high fiber animal feed), gluten meal (high protein animal feed), and starch-based products such as alcohol (e.g., ethanol or butanol), high fructose corn syrup, or food and industrial starch. However, because constructing wet-milling plants is complex and capital-intensive, almost all new biofuels plants built today are dry-milling plants.

Dry milling plants generally convert grains, such as corn, into three products, namely alcohol (e.g., ethanol or butanol), distillers corn oil, and distiller's grains with solubles. A typical corn dry-milling process consists of four major steps: grain handling and milling, liquefaction, saccharification and fermentation, and co-product recovery. Grain handling and milling is the step in which the corn is brought into the plant and ground to promote better starch to glucose conversion. Liquefaction and saccharification is where the starch is converted into glucose. Fermentation is the process of yeast converting glucose into alcohol. Co-product recovery is the step in which the alcohol (e.g., ethanol) and corn by-products are purified and made market ready.

The recovery of alcohol (e.g., butanol, ethanol, etc.) and natural co-products generally begins with the beer (spent fermentation broth) being sent to a distillation system. With distillation, ethanol is typically separated from the rest of the beer through a set of stepwise vaporizations and condensations. The beer less the alcohol extracted through distillation is known as whole stillage, which contains a slurry of the spent grains including corn protein, fiber, oil, minerals, and sugars as well as spent yeast. These byproducts are too diluted to be of much value as mixed together at this point and are further processed to provide the distiller's grains with soluble.

In typical processing, when the whole stillage leaves the distillation column, it is generally subjected to a decanter centrifuge to separate insoluble solids or "wet cake", which includes mostly fiber, from the liquid or "thin stillage", which includes, e.g., free oil and residual insoluble solids, including fine fiber, protein, and yeast, as well as soluble dissolved solids. The thin stillage may be separated into a water soluble solids portion, which includes free oil, and an insoluble solids portion, which includes protein. The thin stillage (or water soluble solids portion) moves to evaporators to boil away moisture, leaving a thick syrup that contains the soluble (dissolved) solids, etc. The concentrated syrup is typically mixed with the wet cake, and the mixture may be sold to beef and dairy feedlots as distillers wet grain with solubles (DWGS). Alternatively, the wet cake and concentrated syrup mixture may be dried in a drying process and sold as distillers dried grain with solubles (DDGS). The resulting DDGS generally has a crude protein content of about 29% and is a useful feed for cattle and other ruminants due to its protein and fiber content. The resulting product is a natural product.

With respect to the evaporators/evaporation, typical dry milling plants are only able to evaporate the thin stillage (with or without oil removed) to about 35% dry solids (DS) because of viscosity issues created by the insoluble solids in the stream. Insoluble solids also foul evaporator tubes, thereby limiting total DS as higher concentrations of insoluble solids make the evaporators inefficient and inoperable. As a result, a substantial portion of the evaporation load is carried by the DDGS dryers, rather than the evaporators. However, such DDGS dryers tend to be rated less efficient than the evaporators. In addition, many plants are capacity limited by dryer capacity. It would be beneficial to reduce evaporator fouling, increase evaporator efficiency, and allow plants to run higher syrup solids, thereby shifting evaporative load from DDGS dryers to the evaporators.

In this regard, some plants recover insoluble solids on thin stillage feed prior to evaporation. However, further improvement is needed, particularly in view of the processing equipment required to remove solids on thin stillage prior to any evaporation. Notably, thin stillage flow rates are typically relatively high. For example, for a standard 100 million gallons per year (MMGY) ethanol facility, the thin stillage flow rate prior to undergoing evaporation is typically around 600 to 800 gpm, however, each process is different and the flow can vary. The equipment requirements for removing insoluble solids from thin stillage at such a high flow rate, and at the low concentration of insoluble solids typical of such thin stillage, can be unduly burdensome. In addition, removing the insoluble solids prior to evaporation results in the insoluble solids being removed prior to oil recovery. This can result in some loss of oil in the insoluble solids and therefore lower oil yield.

Accordingly, there is a need for improved methods and systems for the removal of insoluble solids included in the thin stillage after separation of the same from whole stillage that can overcome certain of the aforementioned disadvantages and/or drawbacks found in typical corn dry milling processes.

SUMMARY OF THE INVENTION

The present invention is directed to methods and systems for removing insoluble solids mid-evaporation in a corn (or similar carbohydrate-containing feedstock) dry milling process for making alcohol, such as ethanol, and/or other biofuels/biochemicals.

In one embodiment, a method for removing residual insoluble solids in a grain dry milling process includes separating a whole stillage byproduct into an insoluble solids portion and a solubles portion, which includes residual insoluble solids. Then, the solubles portion is subjected to a first evaporation, via one or more evaporators, to remove liquid from the solubles portion to define a concentrated solubles portion. After the first evaporation, the residual insoluble solids are separated from the concentrated solubles portion. And thereafter, the concentrated solubles portion is subjected to a second evaporation, via one or more evaporators, to remove additional liquid from the concentrated solubles portion.

In another embodiment, a method for removing residual insoluble solids in a grain dry milling process includes separating a whole stillage byproduct into an insoluble solids portion and a solubles portion, which includes protein and residual insoluble solids. Then, the solubles portion is separated into a solids portion, including the protein, and a water soluble solids portion, including residual insoluble solids. The water soluble solids portion is subjected to a first evaporation, via one or more evaporators, to remove liquid from the water soluble solids portion to define a concentrated water soluble solids portion. After the first evaporation, the residual insoluble solids is separated from the concentrated water soluble solids portion. And thereafter, the concentrated water soluble solids portion is subjected to a second evaporation, via one or more evaporators, to remove additional liquid from the concentrated water soluble solids portion.

In yet another embodiment, a system for removing residual insoluble solids in a grain dry milling process includes a first apparatus that receives a whole stillage byproduct, wherein the first apparatus separates the whole stillage byproduct into an insoluble solids portion and a solubles portion, which includes residual insoluble solids. A first evaporator is situated after the first apparatus and receives the solubles portion, wherein the first evaporator removes liquid from the solubles portion, via evaporation, to define a concentrated solubles portion. A second apparatus is situated after the first evaporator and receives the concentrated solubles portion, wherein the second apparatus separates residual insoluble solids from the concentrated solubles portion. And a second evaporator is situated after the second apparatus and receives the concentrated solubles portion therefrom, wherein the second evaporator removes additional liquid from the concentrated solubles portion, via evaporation.

In another embodiment, a system for removing residual insoluble solids in a grain dry milling process includes a first apparatus that receives a whole stillage byproduct, wherein the first apparatus separates the whole stillage byproduct into an insoluble solids portion and a solubles portion, which includes protein and residual insoluble solids. A second apparatus is situated after the first apparatus and receives the solubles portion, wherein the second apparatus separates the solubles portion into a solids portion, including the protein, and water soluble solids portion, including the residual insoluble solids. A first evaporator is situated after the second apparatus and receives the water soluble solids portion, wherein the first evaporator removes liquid from the water soluble solids portion, via evaporation, to define a concentrated water soluble solids portion. A third apparatus is situated after the first evaporator and receives the concentrated soluble solids portion, wherein the third apparatus separates the residual insoluble solids from the concentrated soluble solids portion. And a second evaporator is situated after the third apparatus and receives the concentrated soluble solids portion therefrom, wherein the second evaporator removes additional liquid from the concentrated soluble solids portion, via evaporation.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

The present invention is directed to methods and systems for removing insoluble solids mid-evaporation in a corn (or similar carbohydrate-containing feedstock) dry milling process for making alcohol, such as ethanol, and/or other biofuels/biochemical.

Figure 1:
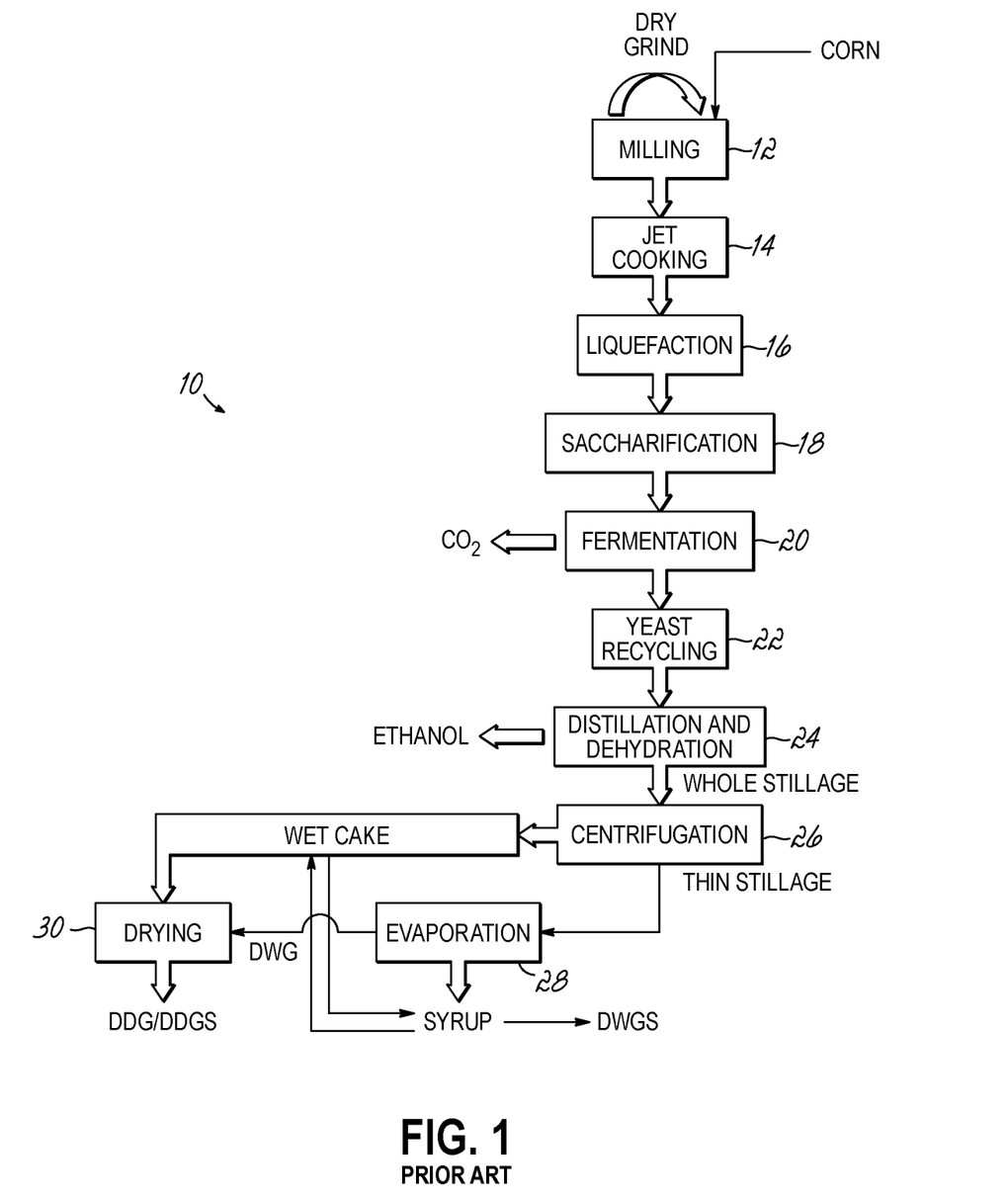
FIG. 1 is a flow diagram of a prior art dry-milling process and system for producing ethanol and distiller's grains with solubles.

FIG. 1 is a flow diagram of a prior art corn dry milling process for producing alcohol, such process is fully discussed in U.S. Pat. No. 8,778,433, entitled "Methods for producing a high protein corn meal from a whole stillage byproduct". A significant portion of alcohol, e.g., ethanol, in the United States is produced from dry milling processes, which convert corn into two products, namely ethanol and distiller's grains with solubles. Although virtually any type and quality of grain (carbohydrate), such as but not limited to sorghum, wheat, triticale, barley, rye, tapioca, cassava, potato, and other starch containing grains can be used to produce ethanol, the feedstock for this process is typically corn usually referred to as "No. 2 Yellow Dent Corn."

With specific reference to FIG. 1, a typical corn dry milling process 10 begins with a milling step 12 in which dried whole corn kernels are passed through hammer mills to grind them into meal or a fine powder. Next, the ground meal can be mixed with water to create a slurry at step 14, and a commercial enzyme such as alpha-amylase is typically added (not shown). The slurry step 14 is followed by a liquefaction step 16 whereat the pH can be adjusted to about 5.2 to about 5.8 and the temperature can be maintained between about 50° C. to about 105° C. so as to convert the insoluble starch in the slurry to soluble starch.

Liquefaction step 16 may be followed by separate saccharification and fermentation steps, 18 and 20, respectively, which may include a pH and temperature adjustment from the separate liquefaction step, although in most commercial dry milling ethanol processes, saccharification and fermentation can occur simultaneously. This single step is referred to in the industry as "Simultaneous Saccharification and Fermentation" (SSF). In the saccharification step 18, the liquefied mash is cooled and a commercial enzyme, such as gluco-amylase, is added to hydrolyze the maltodextrins and short-chained oligosaccharides into single glucose sugar molecules. In the fermentation step 20, a common strain of yeast (*Saccharomyces cerevisae*) is added to metabolize the glucose sugars into ethanol and $CO_2$. Other fermentation agents such as bacteria and clostridia can be utilized. Upon completion, the fermentation mash ("beer") will contain about 18% to 20% ethanol (volume/volume basis), plus soluble and insoluble solids from all the remaining grain components, including fiber, protein, minerals, and oil, for example. Yeast can optionally be recycled in a yeast recycling step 22. In some instances, the $CO_2$ is recovered and sold as a commodity product.

Subsequent to the fermentation step 20 is a distillation and dehydration step 24 in which the beer is pumped into distillation columns where it is boiled to vaporize the ethanol. The ethanol vapor is separated in the distillation columns, then condensed and liquid alcohol (in this instance, ethanol) exits the distillation columns at about 95% purity (190 proof). The 190 proof ethanol can then go through a molecular sieve dehydration column or a membrane separation unit or similar dehydration system, which removes the remaining residual water from the ethanol, to yield a final product of essentially 100% ethanol (199.5 proof).

Finally, at the back end, a centrifugation step 26 involves centrifuging, via a decanter centrifuge, the residuals or whole stillage leftover from distillation so as to separate the insoluble solids portion or "wet cake", which includes fiber, from the liquid portion or "thin stillage" portion, which can include protein, free oil, etc. Next, the thin stillage portion enters evaporators in an evaporation step 28 in order to boil away moisture thereby leaving a thick syrup, which contains the soluble (dissolved) solids as well as protein and oil. The concentrated slurry can be sent to a centrifuge to separate the oil from the syrup in an oil recovery step 29. The oil can be sold as a separate high value product.

This resulting syrup is typically referred to as corn condensed distillers soluble and can be mixed with the centrifuged wet cake then sold to beef and dairy feedlots as distillers wet grain with solubles (DWGS). The wet cake and concentrated syrup mixture may be further dried in a drying step 30 and sold as distillers dried grain with solubles (DDGS) to dairy and beef feedlots and/or the monogastric markets. The distiller's grains with solubles co-product provides a critical secondary revenue stream that offsets a portion of the overall ethanol production cost.

Figure 2:
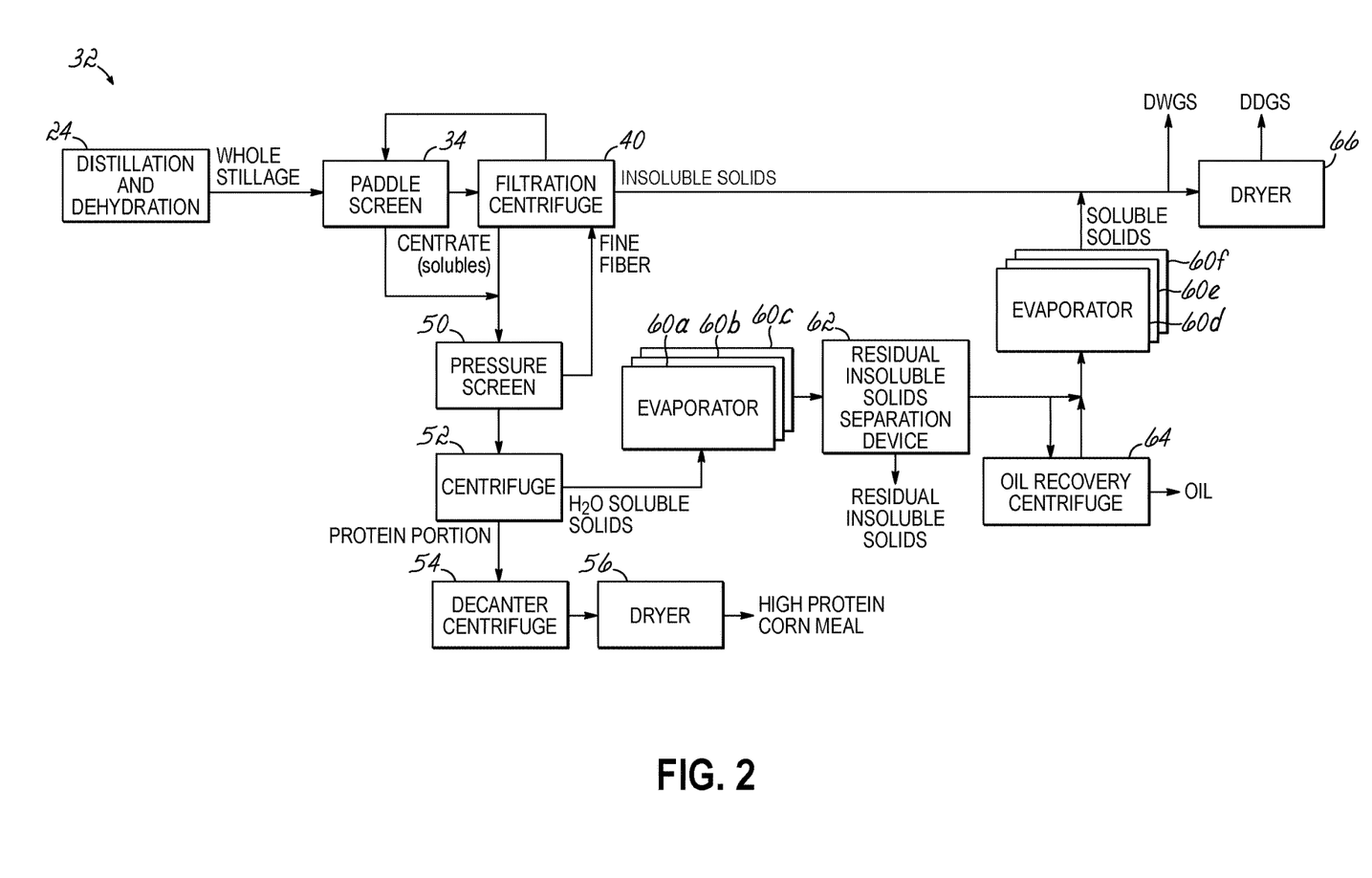
FIG. 2 is a flow diagram of a method and system for removing insoluble solids mid-evaporation in a corn dry milling process for making alcohol in accordance with an embodiment of the invention.

In accordance with the present invention, FIG. 2 schematically illustrates an embodiment of a method and system for removing insoluble solids mid-evaporation in a corn dry milling process for making alcohol, such as ethanol, collectively numeral 32. The whole stillage byproduct may be produced in a typical corn dry-milling process 10 like that just described in FIG. 1. And while a typical whole stillage byproduct can utilized here, it should be understood that the whole stillage from any corn or similar carbohydrate-containing grain dry-milling process may be utilized with the same or similar results. Again, the whole stillage byproduct contains a slurry of soluble and insoluble solids, i.e., the spent grains from the distillation and dehydration step 24, which can include protein, fiber, oil/free oil, and sugars that are processed in accordance with embodiments of this invention and which produce a high protein corn meal that can be sold, e.g., as swine and poultry feed, at a higher cost per ton than typical DDGS or DWGS. In one embodiment, the resulting high protein corn meal includes at least 40 wt % protein on a dry basis as compared to a protein content of about 29% typically found in DDGS.

With further reference to FIG. 2, the whole stillage byproduct can be piped from the typical corn dry mill distillation and dehydration step 24 and subjected to an optional paddle screen 34 or the like. The optional paddle screen 34 is situated before a filtration centrifuge 40, which is further discussed below, so as to aid ultimately in separation of the insoluble solids portion, e.g., fiber, from the centrate (solubles) portion by initially filtering out desirable amounts of water, including soluble dissolved solids, along with free oil and residual insoluble solids, including fine fiber, protein, and yeast, from the whole stillage byproduct. This initial screening can help reduce the resulting load on the subsequent filtration centrifuge 40 or the like. The resulting thrus (centrate) from the paddle screen 34 eventually joins with the centrate (solubles) underflow from the filtration centrifuge 40, as will be discussed in greater detail below.

To filter the whole stillage byproduct, the optional paddle screen 34 can include screen openings of no greater than about 1000 microns. In another example, the paddle screen 34 can include openings therein of no greater than about 500 microns. In another example, the paddle screen 34 can include openings therein of no greater than about 400 microns. In yet another example, the openings therein are no greater than about 300 microns. In another example, the paddle screen 34 can include openings therein of no greater than about 250 microns. In yet another example, the paddle screen 34 can include openings therein of no greater than about 150 microns. In yet another example, the openings therein are no greater than about 75 microns and yet another example, the paddle screen 34 can include openings therein of no greater than about 50 microns. It should be understood that these values are exemplary and that those of ordinary skill in the art will recognize how to determine the size of the openings to achieve the desired filtration. In one example, the optional paddle screen 34 is a standard type paddle screen as is known in the art. One such suitable paddle screen 34 is the FQ-PS32 available from Fluid-Quip, Inc. of Springfield, Ohio. It should be understood that the optional paddle screen 34, as indicated above, may be replaced with other types of pre-concentration or solid/liquid separation devices, e.g., a standard pressure screen, conic centrifuge, filter press, cyclone, or hydroclone, which can perform the desired filtration or preconcentration function. One such suitable pressure screen is the PS-Triple available from Fluid-Quip, Inc. of Springfield, Ohio. In addition, although a single paddle screen 34 (or the like) is depicted, it should be understood that a plurality of screens 34 (or the like) may be situated in-line, either in series or in parallel, and utilized for filtering the whole stillage byproduct.

The whole stillage from the distillation and dehydration step 24, if the optional paddle screen 34 is not present, or the cake (solids) from the optional paddle screen 34 is sent to the filtration centrifuge 40 whereat the whole stillage byproduct or overflow is separated into the insoluble solids portion, which includes fiber, and the centrate (solubles) portion, which includes amino acids, protein, free oil, etc. One such suitable filtration centrifuge is described in Lee et al., U.S. Pat. No. 8,813,973 entitled "Apparatus and Method for Filtering a Material from a Liquid Medium", the contents of which are expressly incorporated by reference herein in its entirety. The filtration centrifuge 40 may be configured to perform both the initial filtering (sometimes referred to as a pre-concentration) of the whole stillage byproduct and washing of the fiber so as to clean the fiber and remove the amino acids, protein, free oil, and other components that remain associated with the fiber after the initial filtration or pre-concentration.

With respect to the filtration centrifuge 40, the washing of the fiber may include a washing cycle, wherein the fiber is mixed and rinsed in wash water, followed by a de-watering cycle, wherein the wash water is separated from the fiber. The washing of the fiber may include multiple rinsing/de-watering cycles. Additionally, a counter current washing technique may be employed to save wash water usage. After washing the fiber, but before the fiber exits the centrifuge, the fiber may go through an enhanced de-watering stage, a compaction stage, and/or an air dry stage to further de-water or dry the fiber. This may reduce the dryer capacity or eliminate the dryer altogether. Eventually, the washed and filtered fiber exits the filtration centrifuge 40 so that the fiber can be further processed, as discussed further below, including dried, to result in a desired product, such as DWG(S) or DDG(S), which can be marketed or sold as is. In one example, the fiber can be transported to a remote site for further processing. Moreover, any separated out portion of slurry from the fiber, e.g., water, amino acids, protein, free oil, wash water, etc., which can occur via screening, is collected to define the centrate (solubles) stream, then transported and further processed as described below. Optionally, a portion of the slurry and/or wash water may be piped back to the optional paddle screen 34 for further reprocessing. The filtration centrifuge 40 may provide the filtered material at a water concentration of between about 55% and about 75% water, which is a significant reduction compared to conventional filtration systems. Various other aspects of the filtration centrifuge 40 are discussed in greater detail in the '433 patent.

With continuing reference to FIG. 2, although a single filtration centrifuge 40 is depicted, it should be understood that a plurality of filtration centrifuges 40, either in parallel or series, may be situated in-line and utilized for separating the whole stillage byproduct into its insoluble solids portion (fiber) and centrate (solubles) portion. And in an alternate embodiment, it is contemplated that the filtration centrifuge 40 can be replaced by a standard pressure screen, decanter centrifuge, a paddle screen, or other like devices as are known in the art to separate the whole stillage byproduct into the insoluble solids portion and centrate (solubles) portion. One such suitable pressure screen is the PS-Triple available from Fluid-Quip, Inc. of Springfield, Ohio. One such suitable decanter centrifuge is the NX-944HS available from Alfa Laval of Lund, Sweden. And one such suitable paddle screen is the FQ-PS32 available from Fluid-Quip, Inc. of Springfield, Ohio. To further enhance the separation of non-protein components from the remaining kernel components, a flocculent and/or surfactant can optionally be added to the whole stillage prior to a first separation step. A flocculent and/or surfactant may help bind fiber and other kernel components together, making separation of those particles more efficient, thus resulting in improved protein and/or oil recovery downstream. Also, the addition of a cellulosic based enzyme (e.g., cellulase, hemicellulose, xylanase, and the like) throughout the process may aid in additional fiber and/or protein recovery.

As further shown in FIG. 2, the centrate (solubles) underflow from the filtration centrifuge 40 is piped to join up with the thrus (centrate) from the optional paddle screen 34 prior to or at an optional pressure screen 50 (or like device), as is known in the art, to further aid in separation of any fine fiber from the centrate (solubles) portion. If the optional paddle screen 34 is not present, the centrate (solubles) underflow from the filtration centrifuge 40 is sent directly to optional pressure screen 50. Prior to being subjected to the optional pressure screen 50, the centrate (solubles) can include protein contained within the kernel of corn. The protein content within this stream ranges from about 24.8% to 33.2% and solids content within this stream ranges from 5% to 15%.

Fiber having a size less than that of the screen of the filtration centrifuge 40 and/or optional paddle screen 34 may pass through and to subsequent steps of the corn dry milling process. At the optional pressure screen 50, the separated fine fiber can be separated from the centrate (solubles) and piped back to the filtration centrifuge 40 or similar unit operations whereat the fine fiber may be filtered out to be further processed. One such suitable pressure screen 50 is the PS-Triple available from Fluid-Quip, Inc. of Springfield, Ohio. In an alternate embodiment, the optional pressure screen 50 may be replaced with a standard paddle screen or decanter centrifuge, as are mentioned above, or other like device, such as a filtration centrifuge, to aid in separation of the fine fiber from the centrate (solubles) portion. In addition, although a single pressure screen 50 is depicted, it should be understood that a plurality of pressure screens 50 (or like device), either in parallel or series, may be situated in-line and utilized for filtering the centrate (solubles) underflow.

The remaining centrate (solubles) portion from the optional pressure screen 50 is then piped and subjected to a centrifuge 52, as is known in the art, to separate the centrate (solubles) portion into a protein portion and a water soluble solids portion. Alternatively, if the optional pressure screen 50 is not present, the centrate (solubles) can be sent directly to the centrifuge 52. The centrifuge 52 can be provided with washing capabilities so that fresh water, recycled water, protein centrate, or combinations thereof, along with the centrate (solubles) portion, can be supplied to the centrifuge 52. The additional fresh water allows for easier separation of the centrate (solubles) into a protein portion and water soluble solids portion. The protein portion, which includes at least a majority of the protein from the centrate (solubles), including some fine fiber and yeast, separates from the water soluble solids portion and is removed as the underflow whereas the water soluble solids portion, which can include at least a majority of the free oil and soluble solids from the centrate (solubles) as well as residual or incidental insoluble solids, such as protein, fine fiber, and yeast, can be removed as the overflow. One such suitable centrifuge 52 is the FQC-950 available from Fluid-Quip, Inc. of Springfield, Ohio. In an alternate embodiment, the centrifuge 52 can be replaced with a standard cyclone apparatus or other like device, as are known in the art, to separate the centrate (solubles) portion into the underflow protein portion and overflow water soluble solids portion. One such suitable cyclone apparatus is the RM-12-688 available from Fluid-Quip, Inc. of Springfield, Ohio. In addition, although a single centrifuge 52 is depicted, it should be understood that a plurality of centrifuges 52, either in parallel or series, may be situated in-line and utilized here. It is contemplated that other suitable apparatuses may be utilized here, which may effectively separate the components by other than weight, for example.

The underflow protein portion from the centrifuge 52 is further piped and subjected to decanter centrifuge 54 to dewater the protein portion. The decanter centrifuge 54 is standard and known in the art. One such suitable decanter centrifuge 54 is the NX-944HS available from Alfa Laval of Lund, Sweden. Other like devices are contemplated. In addition, although a single decanter centrifuge 54 is depicted, it should be understood that a plurality of decanter centrifuges 54 may be situated in-line, either in series or parallel, and utilized here. In an alternate embodiment, the decanter centrifuge 54 may be replaced with a standard filter press or rotary vacuum, or other like device, as are known in the art, to dewater the protein portion. The separated water portion or filtrate from the decanter centrifuge 54 may be recycled back, for example, to the liquefaction step 16 or the fermentation step 20 for reuse in the dry-milling process.

The dewatered protein portion from the decanter centrifuge 54 can be further optionally dried, such as by being sent to a dryer 56, e.g., a spray dryer, ring dryer, flash dryer, or a crystallizer, as is known in the art. In another embodiment, the dewatered protein portion can be subjected to vacuum filtration or other dewatering and drying methods, as are known in the art. The final dried protein product defines a high protein corn meal that includes at least 37 wt % protein on a dry basis and which may be sold as pig, ruminant, fish, or chicken feed, for example. In another embodiment, the high protein corn meal includes at least 40 wt % protein on a dry basis. In another embodiment, the high protein corn meal includes at least 42 wt % protein on a dry basis. In yet another embodiment, the high protein corn meal includes at least 45 wt % protein on a dry basis. In still another embodiment, the high protein corn meal includes at least 50 wt % protein on a dry basis. In yet another embodiment, the high protein corn meal includes at least 60 wt % protein on a dry basis. In still another embodiment, the high protein corn meal includes about 56 wt % protein on a dry basis. The resulting high protein corn meal may be sold at a much higher price per ton than DDGS or DWGS. It should be understood that the type and concentration of protein in the high protein corn meal may vary based on the carbohydrate-containing grain source, the fermentation process, and/or the specific application.

With continuing reference to FIG. 2, the overflow water soluble solids portion, which includes the free oil as well as the residual insoluble solids, is piped from the centrifuge 52 and subjected to a set of three evaporators 60a, 60b, and 60c, as are known in the art, to begin separating the soluble solids from the water soluble solids portion. The evaporators 60a-c evaporate the liquid portion of the water soluble solids portion. Thereafter, a further concentrated water soluble solids portion can be piped and subjected to a residual insoluble solids separation device 62. In the embodiment shown, the partially evaporated or concentrated water soluble solids portion is piped from the evaporators 60a-c and is subjected to the residual insoluble solids separation device 62 upstream of an optional oil recovery centrifuge 64. It will be appreciated that, despite the processing that occurs up to and including the evaporators 60a-c (e.g., the removal of insoluble solids by the filtration centrifuge 40), some insoluble solids can remain in the stream. For example, the partially evaporated or concentrated water soluble solids portion piped from the evaporators 60a-c can include between approximately 10% DS and approximately 35% DS.

The residual insoluble solids separation device 62 operates to remove some or all of the residual insoluble solids (e.g., protein, fine fiber, and yeast) in the stream. In this regard, it will be appreciated that the flow rate of the partially evaporated water soluble solids portion can be significantly less than the typical thin stillage flow rate prior to any evaporation step/evaporators 60a-c. For example, the partially evaporated water soluble solids portion flow rate may be approximately 200 gpm, while the pre-evaporation water soluble solids portion flow rate may be approximately 650 gpm. Moreover, the mid-evaporation water soluble solids have an increased insoluble solids concentration relative to the pre-evaporation water soluble solids portion. Due to the lower flow rate and increased insoluble solids concentration of the mid-evaporation water soluble solids, less equipment may be required to remove the insoluble solids at this stage than at the pre-evaporation water soluble solids portion or the centrate (solubles) stage. Also, some equipment may not be capable of recovering insoluble solids at the low concentration in the centrate (solubles) or the pre-evaporation water soluble solids portion, but may operate well at higher viscosities found in the later evaporation stages, thus allowing solids removal equipment that is unusable on centrate (solubles) or the pre-evaporation water soluble solids portion to operate efficiently on mid-evaporation streams. To further enhance the separation of the residual insoluble solids components from the water soluble solids stream at the residual insoluble solids separation device 62, a flocculent and/or surfactant optionally can be added, for example, to the water soluble solids stream before or after evaporation has begun up to separation of the residual insoluble solids at the residual insoluble solids separation device 62. A flocculent and/or surfactant may help bind protein and other residual insoluble solids components together making separation of these particles, as well as oil, more efficient.

The residual insoluble solids separation device 62 may be a centrifuge (e.g., conic or decanter centrifuge), cyclone, hydrocyclone, filter press, rotary press, paddle screen, or other like density and/or particle size separation device, which can perform the desired separation function. One such suitable decanter centrifuge is the NX-944HS available from Alfa Laval of Lund, Sweden. One such suitable cyclone apparatus is the RM-12-688 available from Fluid-Quip, Inc. of Springfield, Ohio. In addition to or alternatively, a paddle screen or other like screening or filtration device, e.g., a standard pressure screen, which can perform the desired filtration function, may be used. One such suitable paddle screen 34 is the FQ-PS32 available from Fluid-Quip, Inc. of Springfield, Ohio. One such suitable pressure screen is the PS-Triple available from Fluid-Quip, Inc. of Springfield, Ohio. One such suitable residual insoluble solids separation device 62 may be the MZSA (multi-zoned screening apparatus) available from Fluid Quip of Springfield, Ohio. In addition, although a single residual insoluble solids separation device 62 is depicted, it should be understood that a plurality of residual insoluble solids separation device 62 may be situated in-line, either in series or in parallel. In one embodiment, the recovered residual insoluble solids stream can include protein (e.g., gluten), yeast, fine fiber, or residual or incidental free oil, or combinations thereof, for example, while the remaining clarified water soluble solids portion may have less residual insoluble solids, thereby decreasing fouling of evaporators 60d-f and increasing evaporator efficiency. It will also be appreciated that by removing residual insoluble solids from the stream prior to piping the clarified water soluble solids stream to the optional oil recovery centrifuge 64, the oil recovery performance of the centrifuge 64 may be improved, since it is well understood that insoluble solids generally reduce centrifuge performance and yields.

The residual insoluble solids underflow from the residual insoluble solids separation device 62 may be combined with the insoluble solids from the filtration centrifuge 40 or directly to the resulting syrup from the evaporators 60d-f, thereby bypassing the final evaporation stages (e.g., evaporators 60d-f). The residual insoluble solids underflow from the residual insoluble solids separation device 62 also may be sold as-is as animal feed, such as pig, ruminant, fish, or chicken feed or combined with the high protein corn meal, or with DDG or DDGS. The residual insoluble solids underflow may be separately dried via a dryer (not shown), such as a spray dryer, ring dryer, flash dryer, rotary dryer, or a crystallizer, as is known in the art, and sold as animal feed or may be combined with the high protein corn meal, or with DDG or DDGS, for example. The residual insoluble solids underflow from the residual insoluble solids separation device 62 also may be sent to dryer 56 or dryer 66 to be included with the high protein corn meal, or with DDG or DDGS, respectively. In addition, the residual insoluble solids underflow from the residual insoluble solids separation device 62 also may be further dewatered by being subjected to a dewatering device (not shown), such as a press, polishing, or decanter centrifuge, prior to being sent to the DDGS or high protein corn meal dryer. In one example, the residual insoluble solids underflow can be sent to decanter centrifuge 54 so as to be included in the resulting high protein corn meal.

The clarified water soluble solids portion can be piped and subjected to an optional oil recovery centrifuge 64, as is known in the art, so that free oil can be removed therefrom. One such suitable oil recovery centrifuge 64 is the ORPX 647 available from Alfa Laval of Lund, Sweden. In one example, the final recovered oil product can include between about 40 wt % to about 80 wt % of the total corn oil in the corn. In comparison to typical oil recovery in a standard dry mill process, oil recovery centrifuge 64 can function at a higher capacity because the water soluble solids portion, which is subjected to the oil recovery centrifuge 64, includes less liquid and less protein and fiber than normal.

The remaining clarified water soluble solids portion can be piped and subjected to another set of three evaporators 60d, 60e, and 60f whereat the liquid portion is further evaporated from the water soluble solids portion to ultimately yield a soluble solids portion or syrup. While the water soluble solids portion is subjected to two sets of three evaporators 60a-c, 60d-f, it should be understood that the number of evaporators and sets thereof can be varied, i.e., can be more or less, from that shown depending on the particular application and result desired. The second set of evaporators 60d-f can be operated under different conditions than the first set of evaporators 60a-c because of the reduction in insoluble solids from the feed stream. The second set of evaporators 60d-f can see improved heat-transfer and less plugging and fouling and can evaporate the solids to a higher % solids in the final syrup with lower viscosity. It also should be understood that the optional oil recovery centrifuge 64 as well as the residual insoluble solids separation device 62 may be situated not only between the sets of evaporators 60a-c, 60d-f, as shown, but between the individual evaporators themselves, e.g., between 60b and 60d, depending on the particular application(s) or result(s) desired.

The resulting soluble solids portion may be combined with the insoluble solids portion, e.g., fiber, received from the filtration centrifuge 40 to provide distillers wet grains with soluble (DWGS), which may be further dried by a drier 66, as is known in the art, to provide distillers dry grains with solubles (DDGS), both of which can be sold to dairy or beef feedlots, monogastric markets for monogastric animals, or as pet food or aquaculture. In another example, the soluble solids portion may be used as a natural fertilizer, pesticide, or herbicide. In another example, the soluble solids portion may be used as a raw material feed source for conversion to simple sugar, which can be further converted to biofuel or used in other biochemical processes. In yet another example, the soluble solids portion may be used as a raw material feed source for anaerobic digestion or a growth media for fermentation or other processes.

Figure 3:
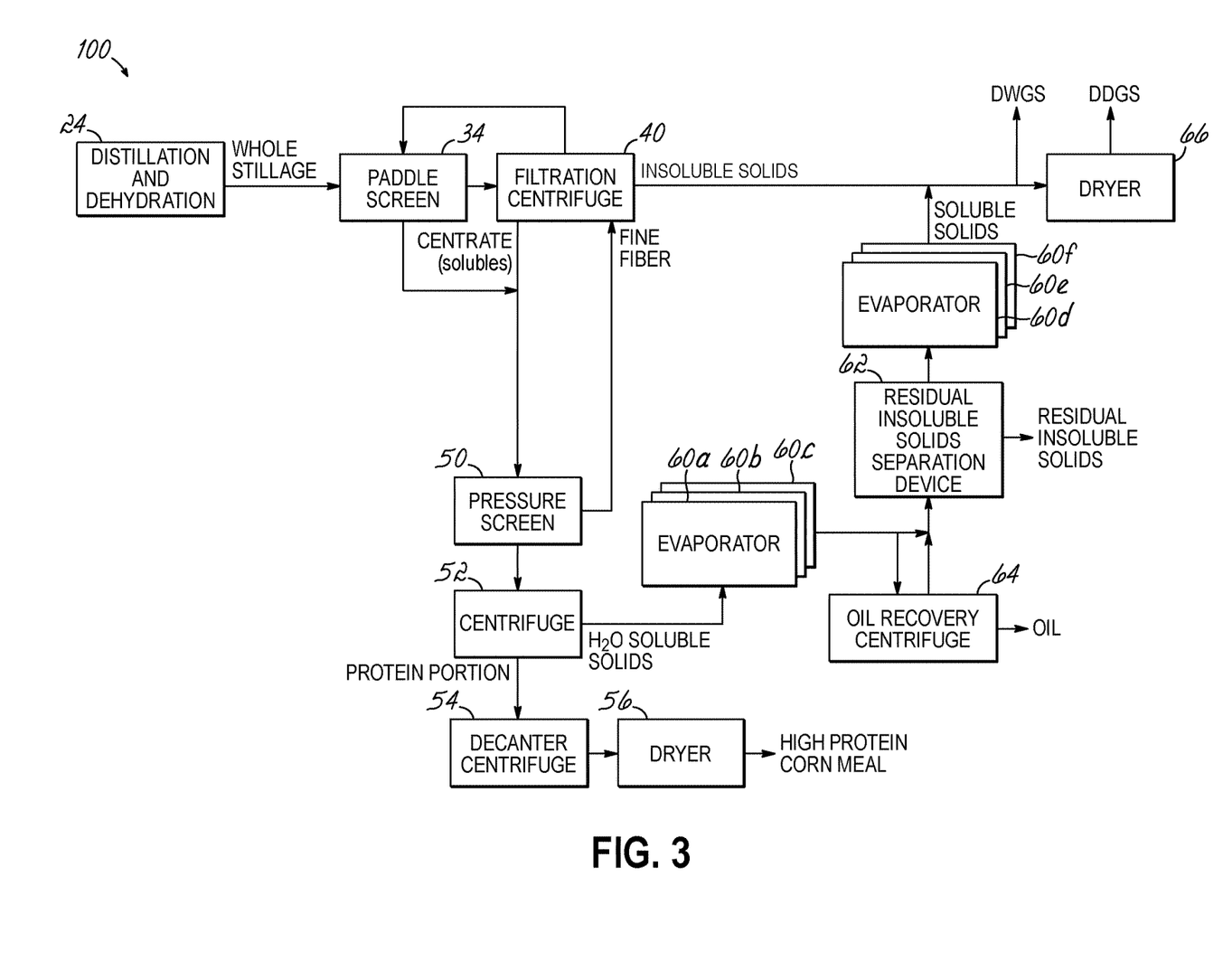
FIG. 3 is a flow diagram of a method and system for removing insoluble solids mid-evaporation in a corn dry milling process for making alcohol in accordance with another embodiment of the invention.

Referring now to FIG. 3, wherein like numerals represent like features, in an alternative embodiment of the present invention, a method and system 100 is provided wherein the residual insoluble solids separation device 62 is positioned downstream of the optional oil recovery centrifuge 64. Thus, in the embodiment shown, the partially evaporated or concentrated water soluble solids portion is piped from the evaporators 60a-c and the optional oil recovery centrifuge 64 and is subjected to the residual insoluble solids separation device 62 upstream of the evaporators 60d-f. The separated residual insoluble solids from the residual insoluble solids separation device 62 may be combined with the insoluble solids from the filtration centrifuge 40 or directly to the resulting syrup from the evaporators 60d-f, thereby bypassing the final evaporation stages (e.g., evaporators 60d-f). The residual insoluble solids underflow from the residual insoluble solids separation device 62 also may be sold as-is as animal feed, such as pig, ruminant, fish, or chicken feed or combined with the high protein corn meal, or with DDG or DDGS. The residual insoluble solids underflow may be separately dried via a dryer (not shown), such as a spray dryer, ring dryer, flash dryer, rotary dryer, or a crystallizer, as is known in the art, and sold as animal feed or may be combined with the high protein corn meal, or with DDG or DDGS, for example. The residual insoluble solids underflow from the residual insoluble solids separation device 62 also may be sent to dryer 56 or dryer 66 to be included with the high protein corn meal, or with DDG or DDGS, respectively. In addition, the insoluble solids underflow from the residual insoluble solids separation device 62 also may be further dewatered by being subjected to a dewatering device (not shown), such as a press, polishing, or decanter centrifuge, prior to being sent to the DDG or DDGS, or high protein corn meal dryer. In one example, the residual insoluble solids underflow can be sent to decanter centrifuge 54 so as to be included in the resulting high protein corn meal.

As discussed above with regard to FIG. 2, due to the lower flow rate and increased residual insoluble solids concentration of the mid-evaporation stream, less equipment may be required to remove the residual insoluble solids at this stage than at the pre-evaporation water soluble solids or the centrate (solubles) stage. The residual insoluble solids separation device 62 again may be a centrifuge (e.g., conic or decanter centrifuge), cyclone, hydrocyclone, filter press, paddle screen, or other like density and/or particle size separation device, which can perform the desired separation function. One such suitable decanter centrifuge is the NX-944HS available from Alfa Laval of Lund, Sweden. One such suitable cyclone apparatus is the RM-12-688 available from Fluid-Quip, Inc. of Springfield, Ohio. In addition to or alternatively, a paddle screen or other like screening or filtration device, e.g., a standard pressure screen, which can perform the desired filtration function, may be used. One such suitable paddle screen 34 is the FQ-PS32 available from Fluid-Quip, Inc. of Springfield, Ohio. One such suitable pressure screen is the PS-Triple available from Fluid-Quip, Inc. of Springfield, Ohio. One such suitable residual insoluble solids separation device 62 may be the MZSA (multi-zoned screening apparatus) available from Fluid Quip of Springfield, Ohio. In addition, although a single residual insoluble solids separation device 62 is depicted, it should be understood that a plurality of residual insoluble solids separation device 62 may be situated in-line, either in series or in parallel.

Here, it will be appreciated that by removing the insoluble solids after, rather than prior to, the oil recovery step 64, the residual insoluble solids separation device 62 may avoid losing any oil that travels with the residual insoluble solids and would otherwise not be recovered by the oil recovery centrifuge 64. Thus, the location of the residual insoluble solids separation device 62 in FIG. 3 may allow for increased oil recovery. Also, to further enhance the separation of the residual insoluble solids components from the water soluble solids stream at the residual insoluble solids separation device 62, a flocculent and/or surfactant optionally can be added to the stream before or after evaporation has begun up to separation of the residual insoluble solids at the residual insoluble solids separation device 62.

Figure 4:
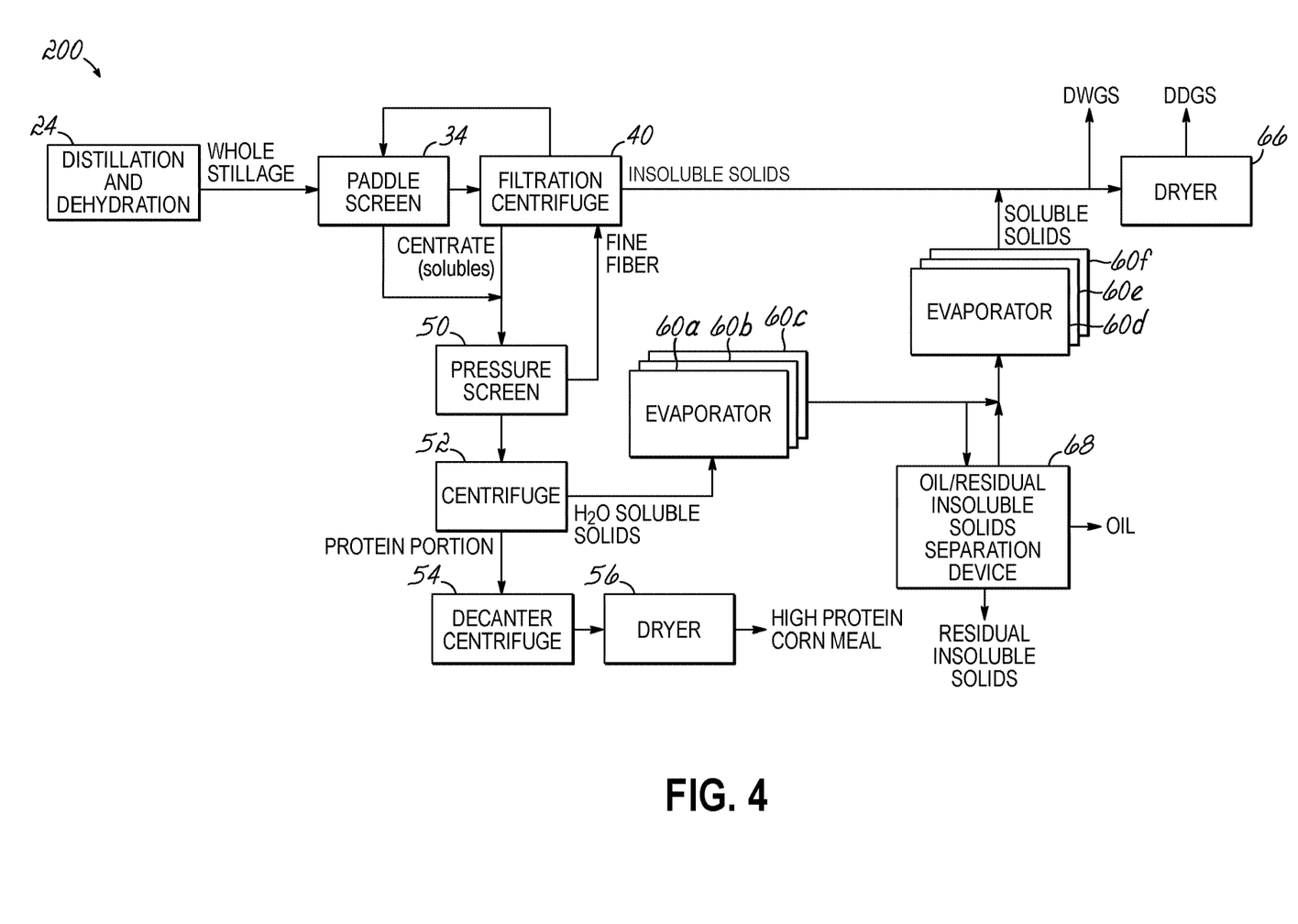
FIG. 4 is a flow diagram of a method and system for removing insoluble solids mid-evaporation in a corn dry milling process for making alcohol in accordance with another embodiment of the invention.

Referring now to FIG. 4, wherein like numerals represent like features, in an alternative embodiment of the present invention, a method and system 200 is provided wherein the function of the oil recovery centrifuge 64 and the residual insoluble solids separation device 62 may be combined and replaced, for example, with an oil/residual insoluble solids separation device 68, such as a 3-stage separation device, including a 3-phase centrifuge (e.g., decanter centrifuge), or other like device whereat the incoming partially evaporated or concentrated water soluble solids portion is separated into three phases. One such suitable 3-stage separation device 68 is 3-phase separation decanter available from GEA Westfalia Separator of Westphalia, Germany. Another suitable 3-stage separation device 68 is a 3-phase tricanter available from Flottweg SE of Vilsbiburg, Germany. Here, a light phase can be primarily the oil phase, a middle phase can be primarily water and solubles, and a heavy phase can be primarily the residual insoluble solids. Rather than, for example, immediately combining the middle phase and the heavy phase into one stream or tank for piping together to the remaining evaporator stages 60*d-f* for further evaporation, the oil/residual insoluble solids separation device 68 separates the underflow stream, which has a high concentration of residual insoluble solids, from the middle phase stream, which has a relatively low concentration of residual insoluble solids, and maintains the separation of these two streams. Also, to further enhance the separation of the residual insoluble solids components from the water soluble solids stream at the oil/residual insoluble solids separation device 68, a flocculent and/or surfactant optionally can be added to the stream before or after evaporation has begun up to separation of the insoluble solids at the oil/residual insoluble solids separation device 68. pH can also be adjusted up or down to improve the separation of the insoluble solids.

The residual insoluble solids underflow from the oil/residual insoluble solids separation device 68 may be combined with the insoluble solids from the filtration centrifuge 40 or directly to the resulting syrup from the evaporators 60*d-f*, thereby bypassing the final evaporation stages (e.g., evaporators 60*d-f*). By removing the residual insoluble solids from the final evaporation stages, the plant may be able to push the final stages of evaporation to further concentrate the syrup to greater than 35%. For example, the final stages of evaporation may be able to concentrate the syrup to at least 50%. The residual insoluble solids underflow from the oil/residual insoluble solids separation device 68 also may be sold as-is as animal feed, such as pig, ruminant, fish, or chicken feed or combined with the high protein corn meal, or with DDG or DDGS. The residual insoluble solids underflow may be separately dried via a dryer (not shown), such as a spray dryer, ring dryer, flash dryer, rotary dryer, or a crystallizer, as is known in the art, and sold as animal feed or may be combined with the high protein corn meal, or with DDG or DDGS, or sold as a wet feed product, for example. The oil/residual insoluble solids separation device 68 insoluble solids underflow from the insoluble solids separation device 62 also may be sent to dryer 56 or dryer 66 to be included with the high protein corn meal, or with DDG or DDGS, respectively. In addition, the insoluble solids underflow from the oil/residual insoluble solids separation device 68 also may be further dewatered by being subjected to a dewatering device (not shown), such as a press, polishing, or decanter centrifuge, prior to being sent to the DDG or DDGS, or high protein corn meal dryer. In one example, the residual insoluble solids underflow can be sent to decanter centrifuge 54 so as to be included in the resulting high protein corn meal.

It will be appreciated that by removing the insoluble solids during, rather than prior to, the oil recovery step, the oil/residual insoluble solids separation device 68 may avoid losing any oil that travels with the residual insoluble solids and that would otherwise not be recovered by the oil recovery centrifuge 64 alone. Thus, the oil/residual insoluble solids separation device 68 may provide improved oil recovery. In addition or alternatively, separating the residual insoluble solids at this stage may allow for more focused treatment of extracting components from the underflow stream, including, for example, treating the emulsion portion to recover more oil, recovering the protein portion, and/or recovering the fine fiber portion for use as animal feed or cellulosic feedstock.

Figure 5:
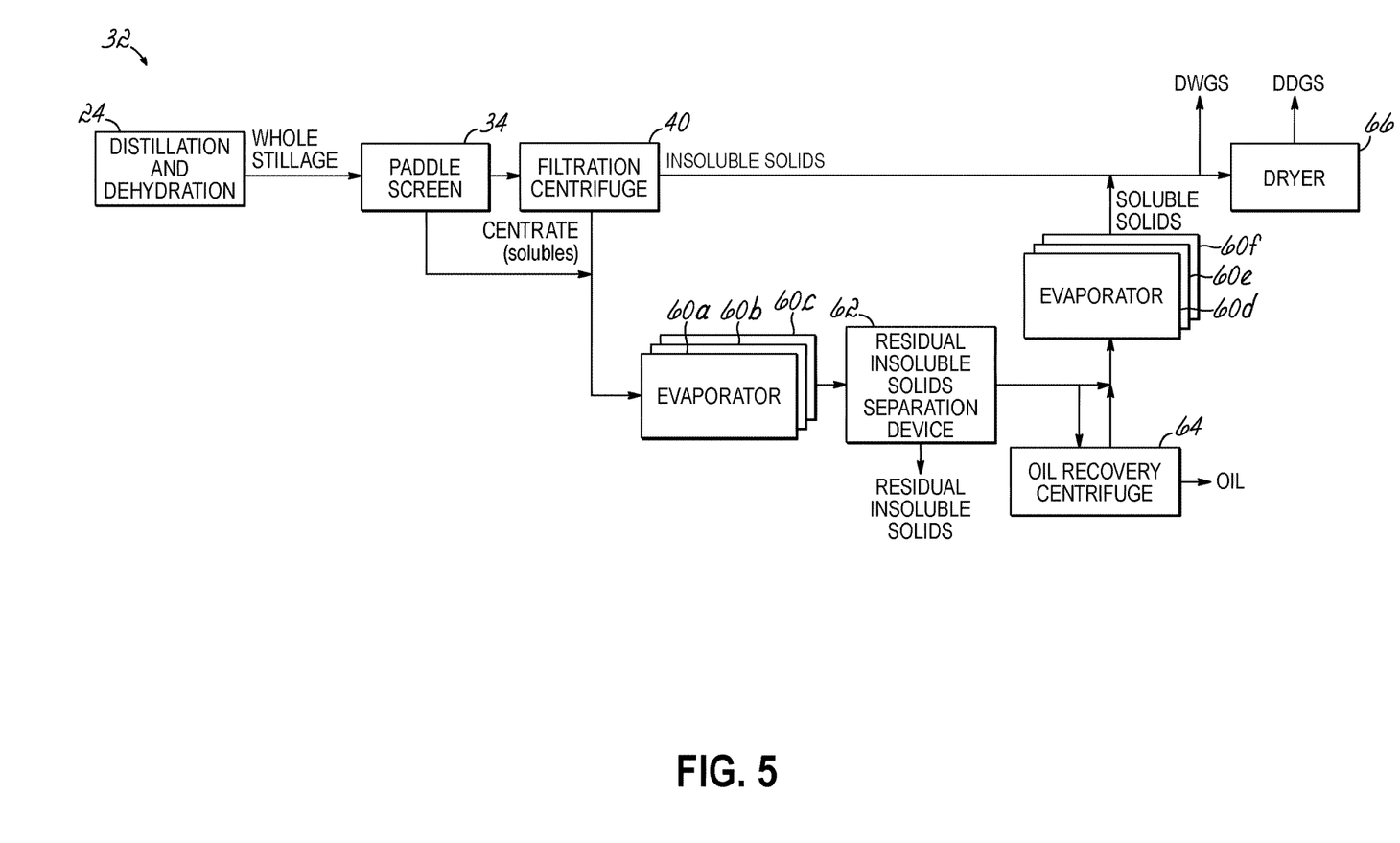
FIG. 5 is a flow diagram of a method and system for removing insoluble solids mid-evaporation in a corn dry milling process for making alcohol in accordance with another embodiment of the invention.

Referring now to FIG. 5, wherein like numerals represent like features, in an alternative embodiment of the present invention, a method and system 300 is provided that is similar to the method and system 100 of FIG. 2 but greatly simplified. Here, the centrate (solubles) stream is sent from the filtration centrifuge 40 directly to the first set of evaporators 60*a-c*. Notably, there is no fine fiber separation, no separation of the centrate (solubles) into a water soluble solids and protein portion, or production of a high protein corn meal. The remainder of the method and system 300 for treat the resulting streams after being subjected to evaporation at evaporators 60*a-c* proceeds in line as discussed above with respect to the method and system 100 of FIG. 2. It will be understood that there is no optional recombining of the underflow residual insoluble solids from the residual insoluble solids separation device 62 with the high protein corn meal, for example. In an alternative embodiment, the filtration centrifuge 40 can be replaced by a standard pressure screen, decanter centrifuge, a paddle screen, filter press, or other like devices as are known in the art to separate the whole stillage byproduct into the insoluble solids portion and centrate (solubles) portion. One such suitable pressure screen is the PS-Triple available from Fluid-Quip, Inc. of Springfield, Ohio. One such suitable decanter centrifuge is the NX-944HS available from Alfa Laval of Lund, Sweden. And one such suitable paddle screen is the FQ-PS32 available from Fluid-Quip, Inc. of Springfield, Ohio. To further enhance the separation of non-protein components from the remaining kernel components, a flocculent and/or surfactant can optionally be added to the whole stillage prior to a first separation step. A flocculent and/or surfactant may help bind fiber and other kernel components together, making separation of those particles more efficient, thus resulting in improved protein and/or recovery downstream. The pH of the feed stream may also be adjusted up or down, resulting in improved protein and/or recovery downstream.

Figure 6:
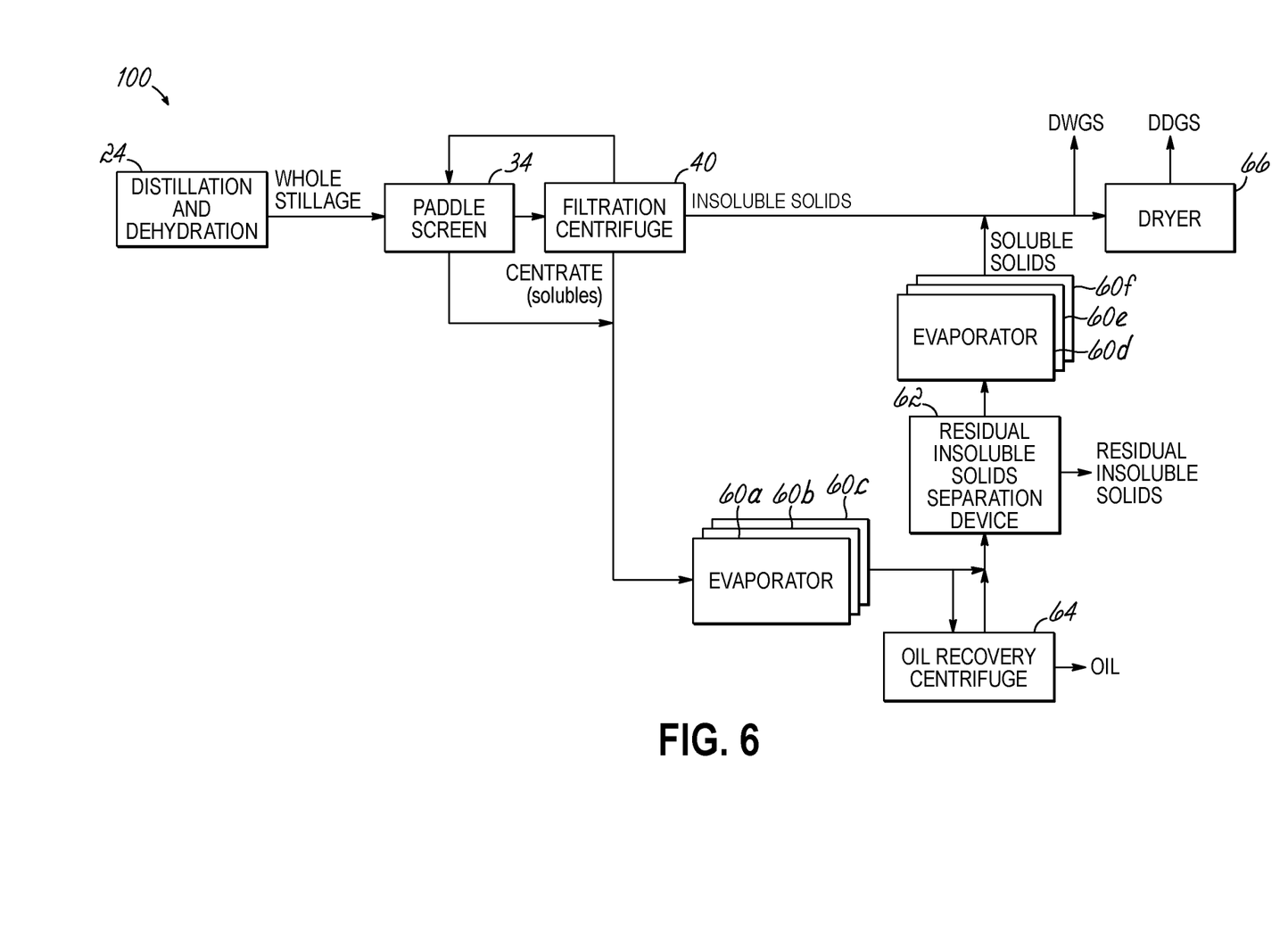
FIG. 6 is a flow diagram of a method and system for removing insoluble solids mid-evaporation in a corn dry milling process for making alcohol in accordance with another embodiment of the invention.

Referring now to FIG. 6, wherein like numerals represent like features, in an alternative embodiment of the present invention, a method and system 400 is provided that is similar to the method and system 300 of FIG. 5 but wherein the residual insoluble solids separation device 62 is positioned downstream of the optional oil recovery centrifuge 64, like as shown and described in FIG. 3.

Figure 7:
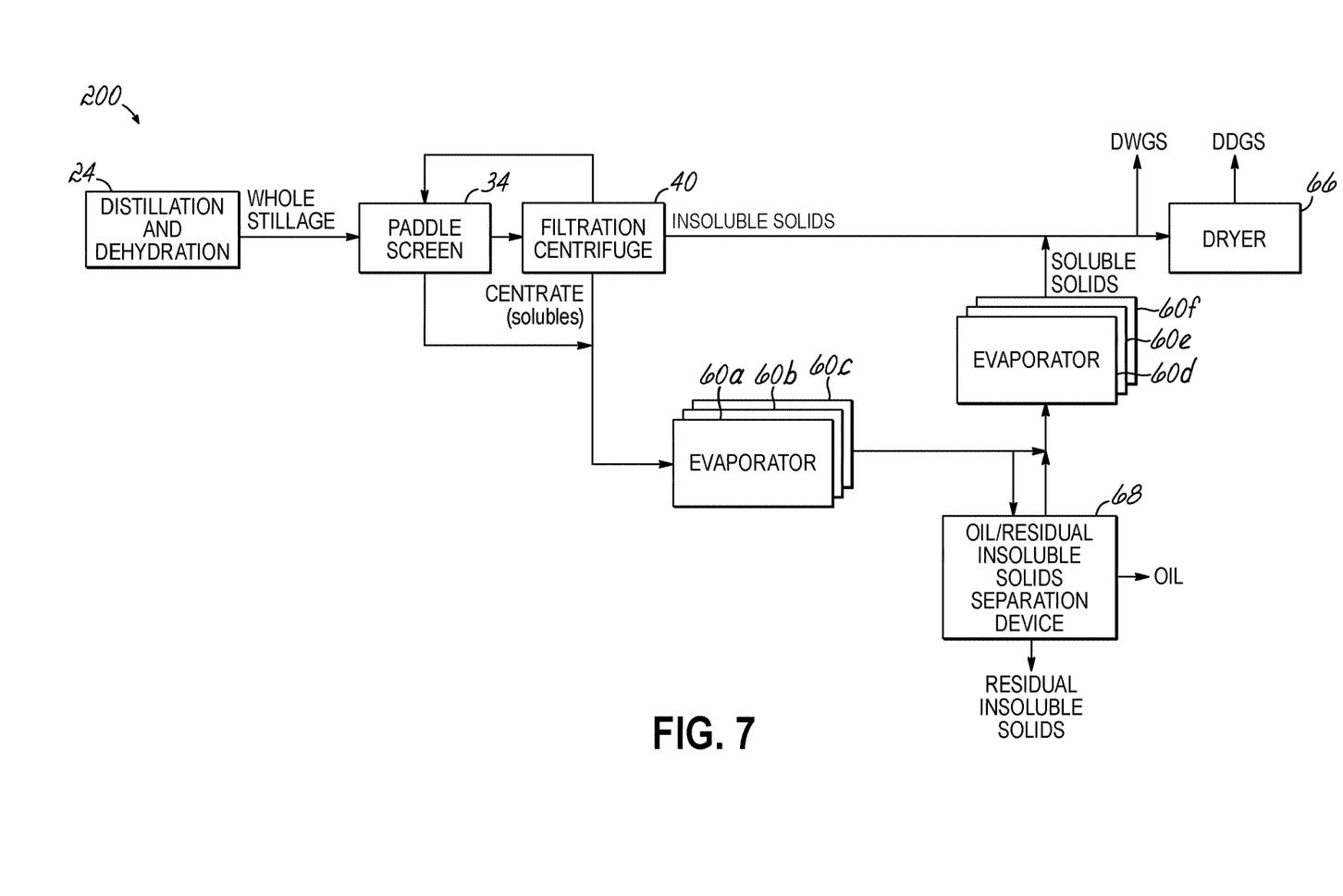
FIG. 7 is a flow diagram of a method and system for removing insoluble solids mid-evaporation in a corn dry milling process for making alcohol in accordance with another embodiment of the invention.

And referring now to FIG. 7, wherein like numerals represent like features, in an alternative embodiment of the present invention, a method and system 500 is provided that is similar to the method and system 400 of FIG. 5 but wherein the function of the oil recovery centrifuge 64 and the residual insoluble solids separation device 62 may be combined and replaced, for example, with an oil/residual insoluble solids separation device 68, such as a 3-stage separation device, including a 3-phase centrifuge (e.g., decanter centrifuge), or other like device, like as shown and described in FIG. 3, whereat the incoming partially evaporated or concentrated water soluble solids portion is separated into three phases.

Accordingly, in these dry mill processes and systems 32, 100, 200, 300, 400, 500 insoluble solids are removed from the concentrated water soluble solids stream mid-evaporation, thereby decreasing the fouling of evaporator tubes and increasing evaporator efficiency to remove water content from the stream. Typical dry mill plants put over 75% of their final syrup on their fiber cake solids either wet or partially dried and rely on the DDGS dryer 66 to provide DDGS. Therefore, increasing the solids in the syrup and decreasing the water content reduces the loading on the DDGS dryer 66. And, because the evaporators 60a-f are typically more efficient than dryers (e.g., approximately twice as efficient), pushing the evaporation load to the evaporators 60a-f from the dryer 66 can result in significant energy benefits. Moreover, many plants are capacity limited by dryer capacity, such that pulling evaporative load from the dryer 66 may allow plants to increase production and/or reduce dryer temperature for gentle drying of the DDGS for improved color and product palatability.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. For example, the residual insoluble solids separation device 62 and optional oil recovery centrifuge 64 may be employed in a typical dry milling process and system, such as is shown in FIG. 1, wherein the thin stillage (as compared to a water soluble solids portion) is directly subjected to evaporation or may be employed in other processes and systems (with or without any separation of the thin stillage into a protein portion and water soluble solids portion for providing a high protein corn meal). Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for removing residual insoluble solids in a grain dry milling process, the method comprising:
    separating a whole stillage byproduct into an insoluble solids portion and a solubles portion, which includes residual insoluble solids;
    subjecting the solubles portion to a first evaporation, via one or more first evaporators, to remove liquid from the solubles portion to define a concentrated solubles portion;
    after the first evaporation, separating the concentrated solubles portion into only a first stream and a second stream, wherein the first stream includes residual insoluble solids, and wherein the second stream includes free oil and soluble solids;
    thereafter, separating the second stream into a free oil stream and a soluble solids stream, wherein the free oil stream defines an oil product; and
    thereafter, subjecting the soluble solids stream to a second evaporation, via one or more second evaporators, which are different than the one or more first evaporators, to remove additional liquid from the soluble solids stream,
    wherein the first stream including the residual insoluble solids is not subjected to the second evaporation.

2. The method of claim 1 further comprising, prior to separating the concentrated solubles portion into the first stream and the second stream, adding a flocculent and/or surfactant to the concentrated solubles portion.

3. The method of claim 1 further comprising, prior to the first evaporation, separating a solids portion, including protein, from the soluble solids portion, including residual insoluble solids.

4. The method of claim 3 further comprising, prior to separating the concentrated solubles portion into the first stream, including the residual insoluble solids, and the second stream, adding a flocculent and/or surfactant to the concentrated solubles portion.

5. The method of claim 3 further comprising drying the solids portion, including the protein, to define a grain meal that includes at least 40 wt % protein on a dry basis.

6. The method of claim 3 further comprising dewatering the solids portion, including the protein, and drying the dewatered solids portion, including the protein, to define a grain meal that includes at least 40 wt % protein on a dry basis.

7. A method for removing residual insoluble solids in a grain dry milling process, the method comprising:
    separating a whole stillage byproduct into an insoluble solids portion and a solubles portion, which includes residual insoluble solids;
    subjecting the solubles portion to a first evaporation, via one or more first evaporators, to remove liquid from the solubles portion to define a concentrated solubles portion;
    after the first evaporation, separating the concentrated solubles portion into only a first stream and a second stream, wherein the first stream includes free oil and defines an oil product, and wherein the second stream includes the residual insoluble solids and soluble solids;
    thereafter, separating the second stream into a residual insoluble solids stream and a soluble solids stream; and
    thereafter, subjecting the soluble solids stream to a second evaporation, via one or more second evaporators, which are different than the one or more first evaporators, to remove additional liquid from the soluble solids stream,
    wherein the residual insoluble solids stream is not subjected to the second evaporation.

8. The method of claim 7 further comprising, prior to separating the second stream into the residual insoluble solids stream and the soluble solids stream, adding a flocculent and/or surfactant to the second stream.

9. The method of claim 7 further comprising, prior to the first evaporation, separating a solids portion, including protein, from the soluble solids portion, including residual insoluble solids.

10. The method of claim 9 further comprising, prior to separating the second stream into the residual insoluble solids stream and the soluble solids stream, adding a flocculent and/or surfactant to the second stream.

11. The method of claim 9 further comprising drying the solids portion, including the protein, to define a grain meal that includes at least 40 wt % protein on a dry basis.

12. The method of claim 9 further comprising:
drying the solids portion, including the protein, to define a dewatered solids portion, including the protein; and
drying the dewatered solids portion, including the protein, to define a grain meal that includes at least 40 wt % protein on a dry basis.

\* \* \* \* \*